United States Patent [19]
Nordström

[11] Patent Number: 5,163,801
[45] Date of Patent: Nov. 17, 1992

[54] CARGO LOADING DEVICE FOR AN AIRPLANE

[75] Inventor: Claes Nordström, Vintrie, Sweden

[73] Assignee: Uni-Load AB, Malmo, Sweden

[21] Appl. No.: 474,070

[22] PCT Filed: Nov. 3, 1988

[86] PCT No.: PCT/SE88/00591
§ 371 Date: Apr. 27, 1990
§ 102(e) Date: Apr. 27, 1990

[87] PCT Pub. No.: WO89/04264
PCT Pub. Date: May 18, 1989

[30] Foreign Application Priority Data
Nov. 3, 1987 [SE] Sweden .................. 8704300

[51] Int. Cl.⁵ .................................. B64C 1/22
[52] U.S. Cl. .................... 414/525.1; 414/527;
414/510; 244/137.1
[58] Field of Search ............ 414/510, 513, 525.1,
414/527, 528, 679; 198/750, 754; 244/118.1,
118.2, 137.1

[56] References Cited

U.S. PATENT DOCUMENTS

| | | | |
|---|---|---|---|
| 1,065,034 | 6/1913 | Ehlert | 414/527 |
| 4,111,318 | 9/1978 | Lutz | 414/527 X |
| 4,747,747 | 5/1988 | Fusco et al. | 414/528 |
| 4,805,852 | 2/1989 | Nordstrom | 244/118.1 X |

FOREIGN PATENT DOCUMENTS

| | | | |
|---|---|---|---|
| 8703857 | 7/1987 | World Int. Prop. O. | 244/137.1 |
| 8706909 | 11/1987 | World Int. Prop. O. | |

Primary Examiner—Robert J. Spar
Assistant Examiner—James Keenan
Attorney, Agent, or Firm—Ladas & Parry

[57] ABSTRACT

A loading device for loading and unloading of a loading space comprising a framework having longitudinal profile strips and transverse coal-fibre foils between which a slide cloth is positioned. A partition limits the loading space and is connected to a transport cloth which extends forwards above the slide cloth to the front end of the loading space and over the front foil and backwards below the slide cloth and at the other end being connected to several pull bands which extend further backwards to the inner end of the loading space below the slide cloth and then forwards above the slide cloth and to the other side of the partition. Two nuts are attached to the partition and cooperate with two longitudinal drive screws. The screws are anchored in the longitudinal direction by sleeves in either end and the sleeves having axial needle bearings as well as radial roller bearings. Two outer longitudinal profile strips are provided with overhangs for grasping sponge-like rivets in the side edge of the transport cloth in order to stretch the slide cloth in the side direction. The loading device is attached in the loading space by locking borders and attachment members.

3 Claims, 8 Drawing Sheets

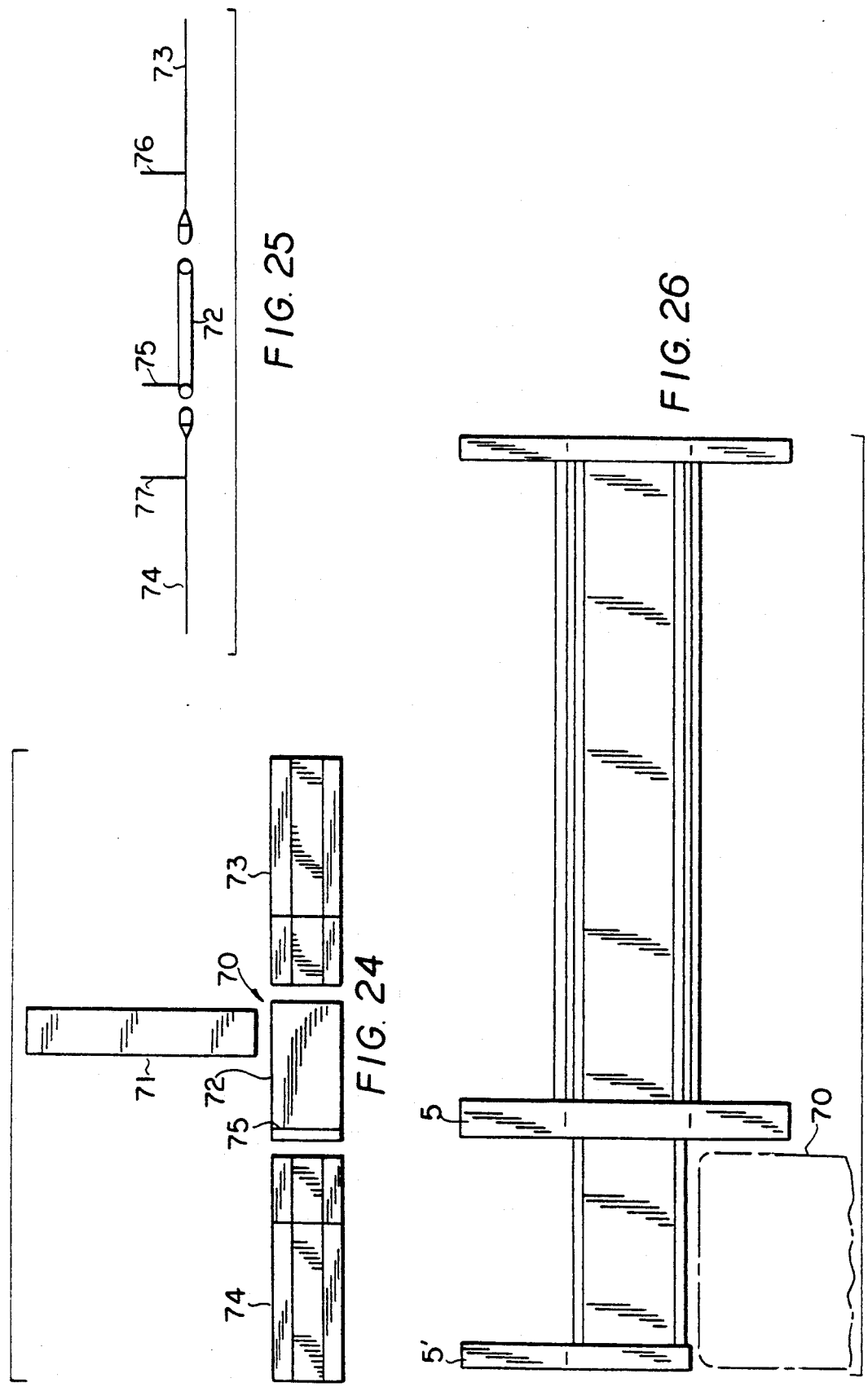

CARGO LOADING DEVICE FOR AN AIRPLANE

AREA OF INVENTION

The present invention relates to a loading device especially intended for loading and unloading of goods in an air-plane such as of the type DC-9.

PRIOR ART

The loading and unloading of goods in an air-plane today has several problems. It is difficult to mechanize the loading and today the loading and unloading takes place manually to a great extent, which means great costs.

Futhermore, the working conditions are often severe for the loading personnel, which leads to the risk of working injuries and a great renewal of personnel.

The loading of goods in an air-plane is a procedure which is sensitive for the air-company, since a wrong handling means that a suitcase will follow the wrong air-plane with resulting complaints. Moreover, damages of suitcases will easily take place.

Thus, there is a desire to be able to mechanize the loading procedure as far as possible so that the working conditions for the personnel can be improved and the risk of wrong handling being minimized. The large air-companies perform an intensive research for finding a loading system which makes possible the mechanizing of the loading and unloading of goods in an air-plane.

In the international patent applications published under Nos. W087/03857 and W087/06909 there are shown a loading device for an air-plane of the above-mentioned type. However, there are certain improvements still to be made in the devices disclosed in said publications until an operating loading device can be constructed.

SUMMARY OF THE INVENTION

The object of the present invention is to provide a loading device that makes possible the mechanizing of the loading and unloading of goods in e.g. an air-plane. The device can also be used at other occasions where goods are moved, such as in a railway wagon, a ship and even in a storage for handling goods in the storage.

The object of the present invention is also to provide a loading device which makes possible a convenient loading and unloading of goods in shallow spaces, such as long, narrow and shallow spaces in an air-plane, whereby the loading can take place from the opening in a convenient working position.

Another object of the invention is to provide a loading device, which is specially adapted for the demands which prevails in an air-plane, i.e. is extremely light, tolerant and reliable.

Thus, there is provided a loading device for e.g. an air-plane for loading and unloading a loading space, comprising a framework having longitudinal profile strips and a front and a back foil, between which a slide cloth is adapted. Moreover, there is a partition limiting the loading space and a transport cloth. One end of the transport cloth is connected to the partition and extends forwards above the slide cloth to the front end of the loading space and over a breaking edge and backwards below the slide cloth. The other end of the transport cloth is connected to several pull bands extending further backwards to the inner end of the loading space below the slide cloth and thence forward above the slide cloth and to the other side of the partition where they are connected to the partition.

According to the invention there are at least two longitudinal drive screws and corresponding nuts for driving the partition and the transport cloth and the pull bands from the outer end of the space to the inner end of the space and vice versa for loading and unloading of goods in the loading space.

Preferably, the screw is made of a complex construction of an aluminium tube with outer windings and a coal-fibre rod attached by glue in the interior of the aluminium tube Preferably, the screw is anchored in the longitudinal direction by sleeves in each end, said sleeves having both axial needle bearings and radial roller bearings.

According to a further preferred embodiment, the screw is anchored in positions between the ends for prevented uncontrolled deflections of the screw at rotation, especially at high rotation speeds. Then, the nut is provided with slits for the passage of said anchorages.

The front end of the foil is rounded to a break edge having a radius of curvature which is suitable so that the transport cloth can pass and be folded around said front end. Moreover, the slide cloth is attached to the foil by an elastic connection and has a key-shaped member at the front end, which gives a soft transition to the foil. The break edge can also be provided with rollers at the front end to make more easy the transition of the transport cloth.

Preferably, the slide cloth is made of a material having course strands in the longitudinal direction for being a good slide surface in the longitudinal direction and make difficult the sliding in the transverse direction.

SHORT DESCRIPTION OF THE DRAWINGS

Several embodiments of the invention are described in more details below with reference to the appended drawings.

FIG. 24 is a schematic plan view showing the loading of an air-plane having double loading spaces.

FIG. 25 is a schematic side view of the device of FIG. 24.

FIG. 26 is a schematic plan view of another embodiment of the loading device according to the invention.

DETAILED DESCRIPTION OF THE INVENTION

Figure 1:
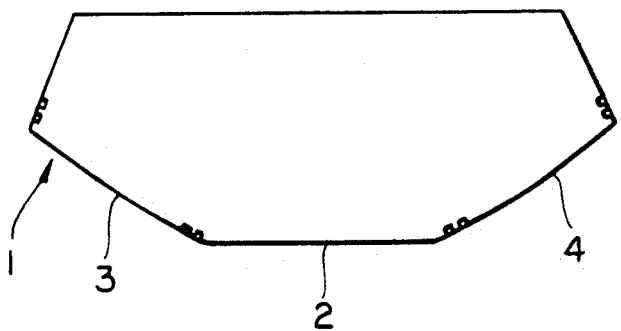
FIG. 1 is a schematic cross-sectional view of a loading space of an air-plane in which the present invention is intended to be used.

FIG. 1 schematically shows the loading space of an air-plane of the type DC-9 in cross-section in which the loading device according to the present invention is intended to be used. The loading space is usually divided in two portions and extends from the loading or door opening and forwards and backwards in the airplane. Hereinbelow, only one of these spaces will be shown, but it is realized that one loading device can be positioned in each space.

The loading space 1 comprises a horizontal portion 2 (the floor) and two connecting sloping portions 3 and 4. Furthermore, there are a ceiling and walls. Other types of loading spaces exist in other types of air-planes and there can be further connecting sloping portions. A skilled person realizes that the invention is easily adaptable to different types of such spaces.

The loading space is comparatively shallow, i.e. so low that a person cannot stand straight in the space. If the space is to be loaded by hand, such as is done today, the personnel must crawl into the space and move the goods by hand in this inconvenient position to the opening of the space where the goods then are loaded to a transport vehicle of conventional kind.

According to the invention, the space is provided with a transport band which moves the goods from the opening of the loading space and towards the inner end thereof at loading and vice versa. Thus, it is assured that the goods are not damaged at the movement to the inner end of the space and that the space will be well used without the necessity for the personnel to crawl into the space.

A transport device suitable for this purpose should fulfill some demands. The device must be very light and reliable in order to be able to be used in an air-plane. A standstill is expensive and must in principle not take place.

According to the invention, the device is moreover self-supporting, i.e. it can by itself take up all forces in the longitudinal direction caused by the driving of the loading device while the floor of the loading space takes up the load of the goods.

Figure 2:
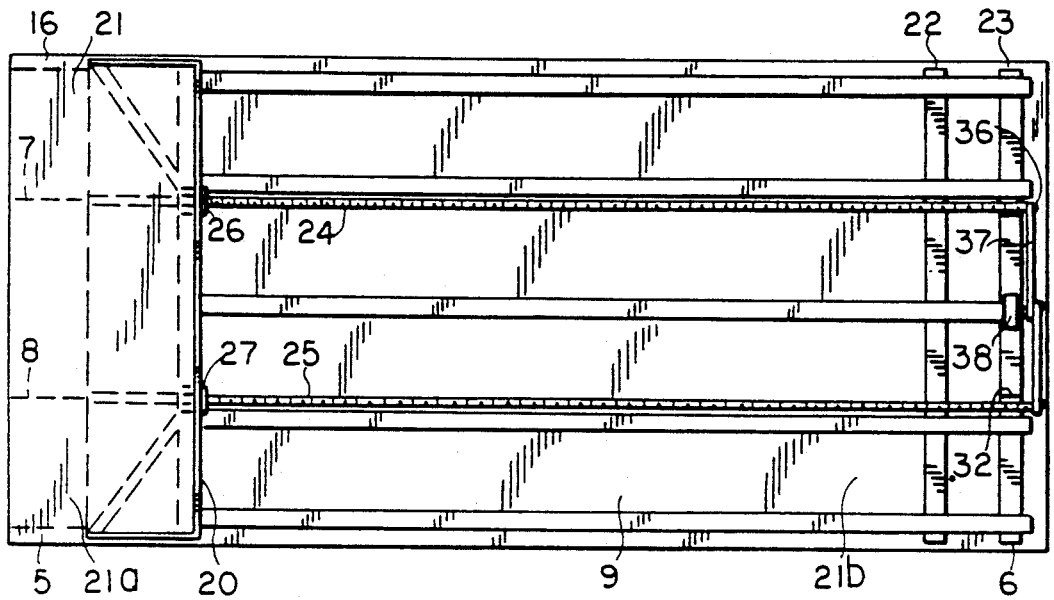
FIG. 2 is a plan view of the loading device according to the invention.

As appears from FIG. 2, the transport band according to the invention is formed by a framework comprising two transverse lightweight foils 5, 6 interconnected by two or several longitudinal strips 7, 8 having e.g. T-profile. The foils 5, 6 and the T-profiles 7, 8 are preferably made of a very light and strong coal-fibre construction and has a construction and operation which appears more closely from the description below.

A strong slide cloth 9 is attached between the foils 5, 6 and the T-profiles 7, 8. The slide cloth 9 comprises strong longitudinal strands of e.g. NYLON. The transverse strands are of cotton. Thus, said slide cloth has a rough surface having a structure in which the sliding in the longitudinal direction parallel with the NYLON strands is easy but sliding in the transverse direction perpendicular to the NYLON strands is difficult. It is realized that other materials can be used for achieving the same operation.

Figure 6:
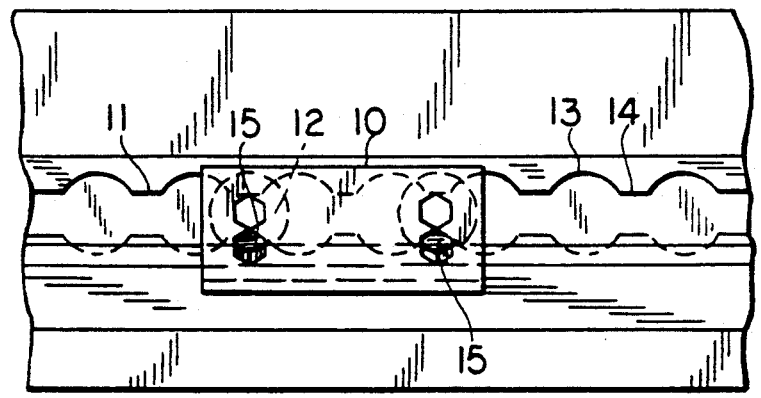
FIG. 6 is a plan view and FIG. 7 is a cross-sectional view showing the attachment of the longitudinal side of the transport cloth and the slide cloth.
Figure 7:
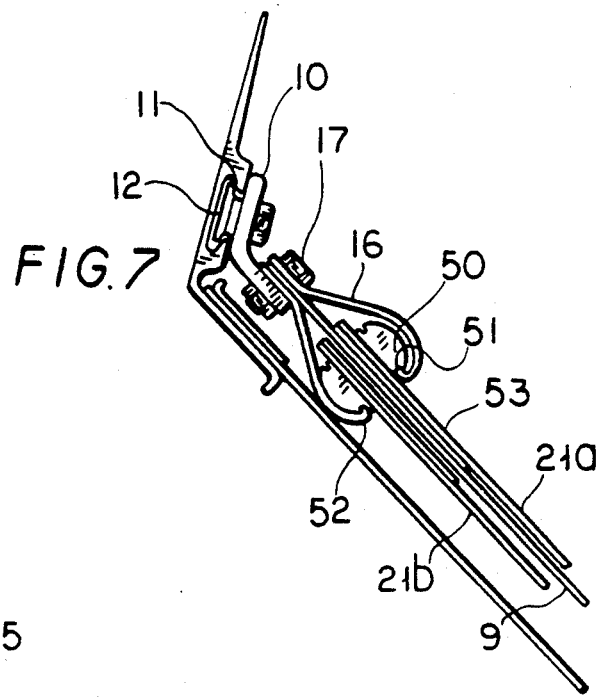

The slide cloth 9 extends over the floor of the space and up along the sloping portions 3, 4 and are attached at the outer longitudinal edges thereof as shown more closely in FIGS. 6 and 7. The slide cloth 9 is provided with several attachment members 10 spaced along the length of the slide cloth. The slide cloth can also be divided in three or several portions in the transverse direction of the space.

The attachment members 10 are attached at the horizontal and sloping portions of the air-plane in locking borders 11 which already exist in the loading space of the air-plane. If such locking borders do not exist, the attachment members are attached to anchorage plates or similar anchorages at the sheeting.

The attachment member 10 has two button-like portions 12 and the locking border 11 has several recesses 13 followed by narrower portions 14. The buttons 12 of the attachment members can be inserted in the recesses 13 whereupon the attachment members 10 are replaced in the side-direction so that the buttons 12 are placed opposite to the narrower portions 14. By means of two locking screws 15, the attachment member is locked in place in the longitudinal direction.

The slide cloth 9 is attached at the attachment members 10 between two longitudinal profile strips 16 by several bolts 17 or similar as appears from FIG. 7.

Figure 10:
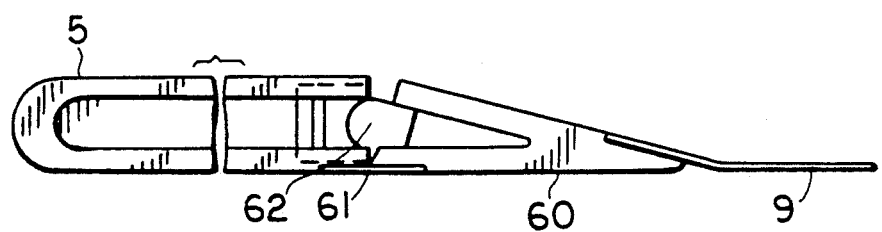
FIG. 10 is a plan view and FIG. 11 is a cross-sectional view of an alternative attachment of the front end of the slide cloth.
Figure 11:
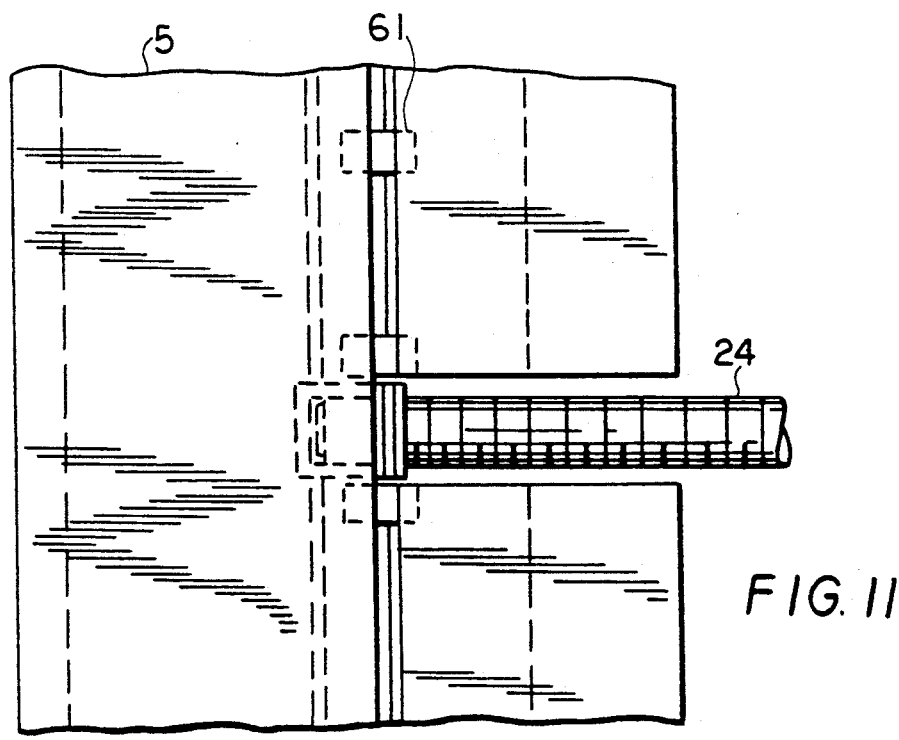

The front end of the slide cloth 9 is attached to the front foil 5 through a hinged connection shown in details in FIGS. 10 and 11. The cloth 9 is ended by a key-shaped member 60, which forms a smooth transition between the front foil 5 and the glide cloth so that the goods do not need to pass a sharp edge. The key-shaped member 60 is attached to the lower edge of the front foil 5 with a strong tape 61. Moreover, there is a guiding member 62 for allowing the key-shaped member 60 to pivot at the joint formed by the strong tape 61 for adoption to different operating conditions.

Figure 9:
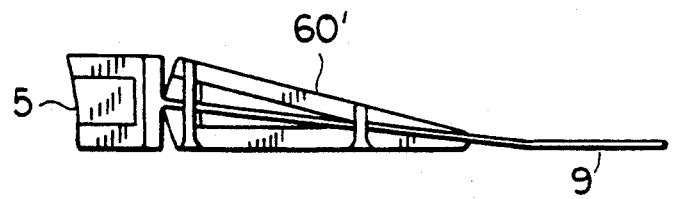
FIG. 9 is a cross-sectional view showing the attachment of the front end of the slide cloth.

FIG. 9 shows an alternative joint of the connection between the cloth and the foil. The glide cloth extends all the way to the front foil 5 and is anchored to the foil. In this embodiment, the key-shaped member 60' extends on both sides of the glide cloth 9. In this embodiment, the pivot point will be positioned centrally.

A transport device is adapted at the framework described above. The transport device comprises a moveable partition 20 and a transport cloth 21 attached thereto as shown in FIG. 2. The cloth 21 extends forwards above the slide cloth 9 and above the front foil 5 mentioned above and thence backward below the slide cloth 9.

A transverse reinforcement 22 is provided at the bottom end of the cloth 21 preventing the cloth 21 from collapsing in the transverse direction and also forming a soft transition without edges. The cloth 21 is further elongated with several pull bands 23 extending around the back foil 6 and thence to the backside of the partition 20.

The cloth 21 is made of a material which together with the slide cloth 9 prevent sliding in the transverse direction but makes easy the sliding in the longitudinal direction. The cloth 21 is suitably reinforced, e.g. by KEVLAR fibres, in both the longitudinal and the transverse directions.

The framework comprising the T-profiles 7, 8, the foils 5, 6, the partition 20, the cloths 9 and 21 and the pull bands 23 described above form a self-supporting unit which is attached in the loading space where the invention should be used, especially in a loading space in an air-plane. The partition 20, the cloth 21 and the pull bands 23 form together a transport band which can be moved in the longitudinal direction from one side of the device to the other side and vice versa.

The manner of attaching the loading device of course varies with the application area.

By the method described above in connection to FIGS. 6 and 7 for attaching to framework to the body of the air-plane, the advantage is obtained that the floor below the device can be inspected without difficulty. It is a requirement for the sake of safety that the floor below the transport band should be open for inspection for possible damages at a routine check-up or routine inspection. The attachment members 10 in the nature of a releasable connection makes possible such an inspection.

The screw 15 locks the attachment member 10 in the longitudinal direction. By loosening of the screw and moving the attachment member 10 a short distance in the longitudinal direction, each attachment member can be made free and the entire device can be lifted upwards for the desired inspection. It is then only necessary to make free the front attachment members, whereupon the device can be pivoted around the inner attachment members which then operates as hinges.

Several, preferably two, longitudinal screws 24, 25 are positioned between the foils 5 and 6 as appears from FIG. 2. Several, preferably two, nuts 26, 27 are attached to the partition. Even if the number preferably is two, the number can be four in an extra wide application and in narrow spaces only one screw can be used.

Figure 12:
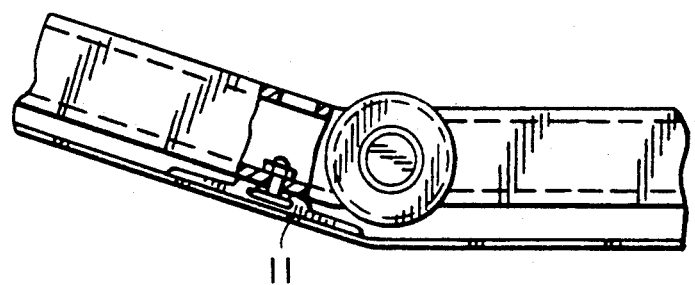
FIG. 12 is an end view.
Figure 14:
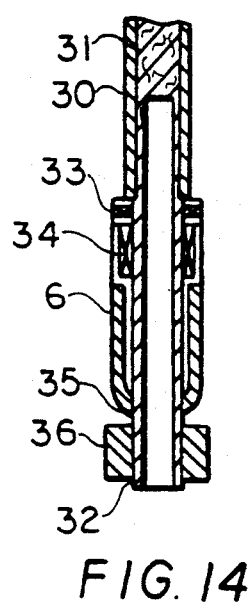
FIG. 13 is a plan view and FIG. 14 is a cross-sectional view showing the attachment of the screw at the back foil and the attachment at a locking border in the loading space.
Figure 13:
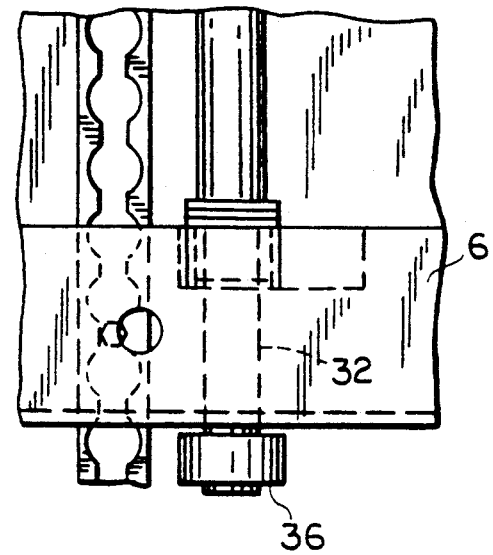

The attachment of the screws 24, 25 to the foils is shown in more details in FIGS. 12-14. The screw comprises an outer aluminum tube 30 provided with outer windings for a ball nut. Suitable winding type is standard SKF-winding for this purpose. The aluminium tube is provided with a coal-fibre rod 31 at its interior which fills the entire interior cross-section and makes up the reinforcement in the longitudinal direction. The coal-fibre rod is provided with shallow longitudinal grooves in which a suitable glue is applied at or before the mounting. The aluminium tube and the coal rod have such fitting tolerances that the coal-fibre rod can be inserted in the aluminium tube after heating and expansion of the aluminium tube. When the aluminium tube cools, it will shrink and locks the coal-fibre rod in the longitudinal direction. The glue is squeezed out in possible cavities and the coal-fibre rod will have a very firm attachment to the inner surface of the aluminium tube. The screw thus composed is lighter than the corresponding construction in only aluminium and has a sufficient tensile strength for transmitting the tensile loads to the anchorages of the screw. The coal-fibre rod can also in certain applications be hollow, i.e. be a tube.

The screws are attached at the respective ends at the foils 5, 6, of FIG. 2. In FIG. 13 and FIG. 14 the attachment to the trailing foil 6 is shown. The screw is anchored in a sleeve 32 having both axial bearings by means of needle bearings 33 and radial bearings by means of roller bearings 34. The sleeve is attached to the foil in a suitable manner not shown. A similar anchorage exists at the front foil 5.

The screw extends further through the sleeve 32 and passes the foil 6 through a suitable hole 35 and is ended by a pulley 36 intended for a toothed belt 37, of FIG. 2. The belt 37 extends to a centrally positioned electrical drive motor 38 (having a planet gear) which drives both screws 24, 25. By means of the toothed drive belt 37 it is assured that the screws always rotate at the same speed.

There can be a single common drive belt enclosing the pulleys of both drive screws and the pulley of the motor. Then, if the drive belt breaks the drive ceases simultaneously on both (all) screws which prevents the risk of jamming.

The nuts 26, 27 are attached to the partition 20 and comprise nuts having balls moving in the windings of the screw. This type of ball drive is very reliable and has a very small friction resistance. Of course other types of nuts can be used, e.g. with inserts of TEFLON.

From the description above it is clear that the partition 20 and the cloth 21 can by driven from one end of the space to the other by means of the electric motor 38, which rotates the screws 24, 25 in the desired direction thereby driving the partition 20 and the transport cloth 21. The goods are loaded on the front end of the transport cloth 21 before the partition 20 and follow the transport cloth into the loading space at the rotation of the screw in the direction inwardly. At the unloading, the opposite transport takes place and the screw drives the transport cloth and the partition towards the opening. The goods are transported by the transport cloth while the partition performs a pushing action so that the goods reache the opening of the space where they are unloaded as described closer below.

As appears from FIG. 14 the break edge of the foil 6 (and also the foil 5) has a suitable radius of curvature so that the cloth and the pull bands easily can be folded 180° over the break edge. In certain cases it can however be better to use rollers instead of the foils, at least at the back foil, whereby the friction losses encountered at the folding around the trailing foil can be eliminated. Moreover, the front foil can be provided with small integral rollers at the extremity.

Figure 17:
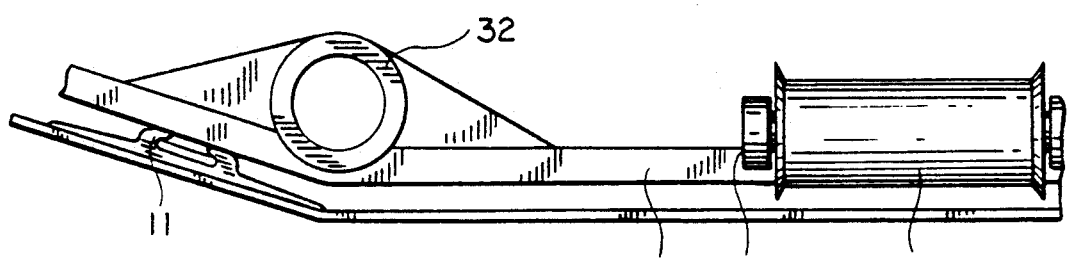
FIG. 17 is an end view and FIG. 18 is a plan view of the back portion of the loading device according to FIG. 3 wherein the back foil has been replaced by several rollers.
Figure 18:
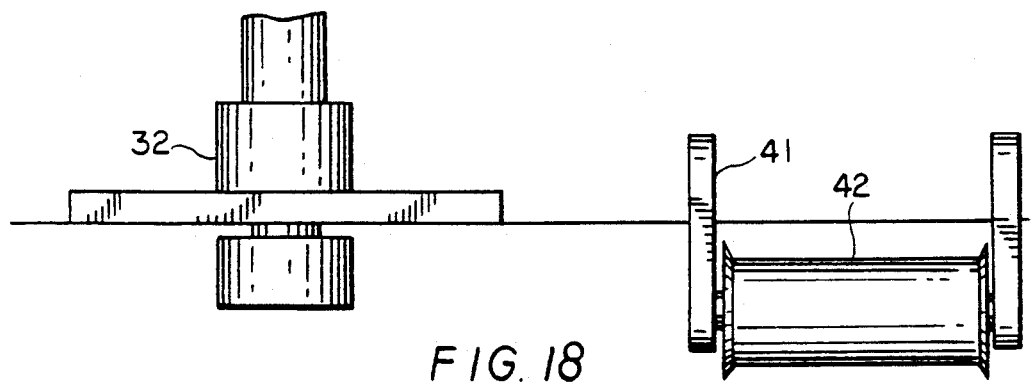
Figure 19:
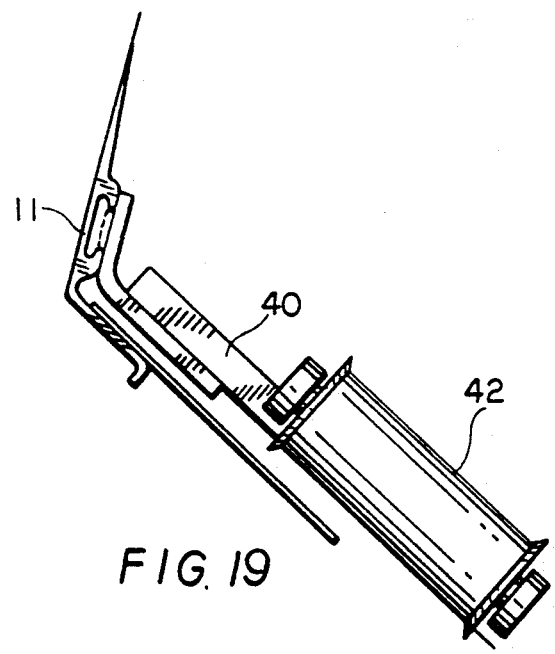
FIG. 19 is an end view corresponding to FIG. 17 and shows the attachment at the side of the device.

Such a solution is shown in more details in FIG. 17 and FIG. 18. A sleeve 32 for anchorage of the screw is directly attached in a cross beam 40 which is attached by button-like attachment members (having a hinge) similar to the attachment members 10 mentioned above, in the locking border 11 of the air-plane. The back foil 6 is replaced by the cross-beam 40. Several holders 41 for rollers 42 are attached to said beam 40. The pull bands 23 extend over said rollers 42 instead of over the foil 6. The operation is obvious to a skilled person. In FIG. 19 there is shown how the beam 40 is attached at its ends in a locking border 11 by hinged attachment members.

Figure 3:
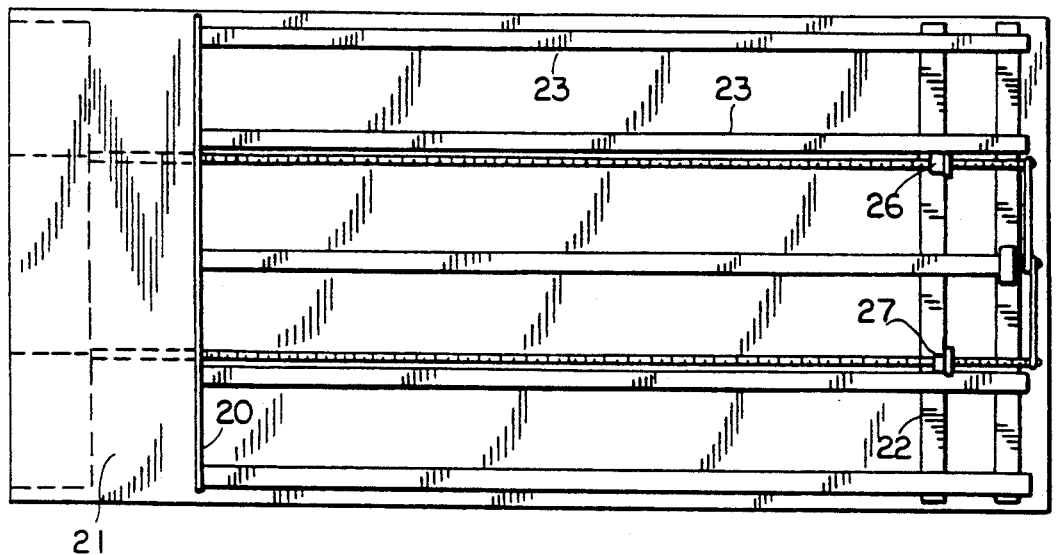
FIG. 3 is a plan view of an alternative driving of the loading device according to the invention.

It is not necessary to attach the nuts 26, 27 in the partition but also other attachment positions are possible. In FIG. 3 there is shown an alternative solution in which the nuts 26, 27 are arranged on the reinforcement 22 mentioned above in the lower part 21b of the cloth.

Figure 4:
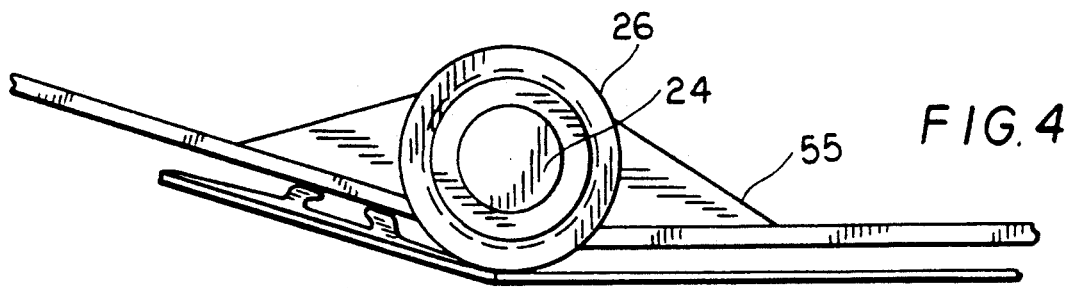
FIG. 4 is an end view and FIG. 5 is a plan view in an enlarged scale showing the attachment details at the embodiment of FIG. 3.
Figure 5:
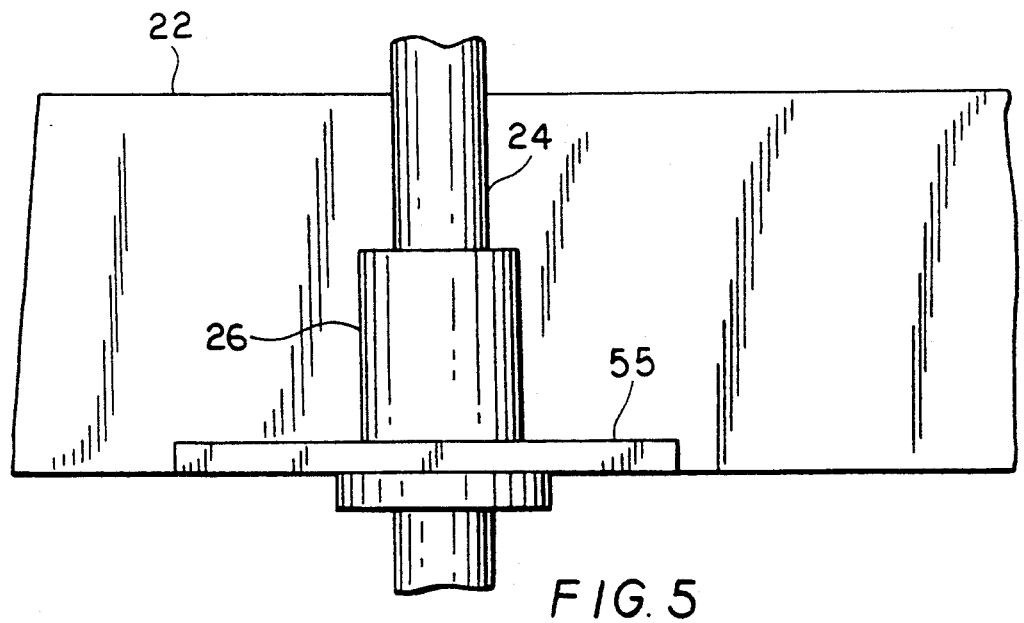

In FIG. 4 and FIG. 5 there is shown how the nut 26 is attached to a cross wall 55 adapted on the reinforcement.

By using a drive means having two (or several) screws the advantage is obtained that the partition always is moved parallel with the cross direction and the risk of jamming at uneven loading in the transverse direction is avoided. The screws do not allow the partition to move more at one side than the other due to the driving with a toothed belt. Thus, no guiding of the partition in relation to the side walls of the space is needed. Of course, a single drive screw can be used together with suitable guidings.

Figure 15:
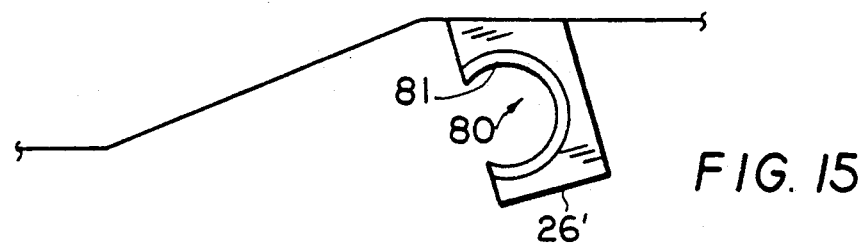
FIG. 15 is an end view and FIG. 16 is a plan view of an alternative embodiment of the nuts for cooperation with the screws.
Figure 16:
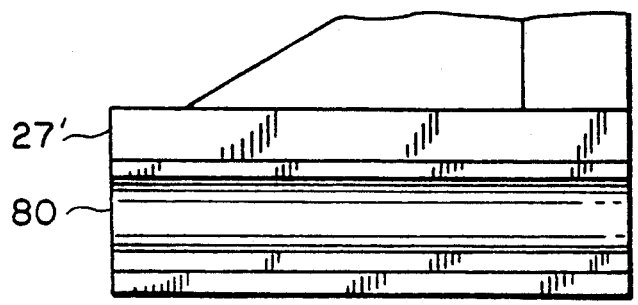

FIG. 15 shows the nuts 26' and 27' of an alternative preferred embodiment. The nuts do not completely enclose the screws 24, 25 but extend over about 270° and are open at a slit 80. This gives the advantage that gravel and soil automatically leaves the nut without any harm, so called self-cleaning. In this case it is preferred that the insert 81 in the nut contacting the windings is of TEFLON instead of balls.

Moreover, this slit 80 will enable the drive screw to be anchored at positions between its ends by means of sleeves countersunk in the screw and anchored in the construction. Said sleeves can be anchored in beams of the same type as beam 40 shown in FIG. 17. Then the nut can pass the sleeves by means of the slit 80 in the nut. The reason that it sometimes is desired to anchor the screw at intermediate positions is that the screw at certain critical rotation speeds tends to deflect uncontrollable, which is prevented by the anchorage. Normally it is sufficient with an anchorage at the middle of the screw but several anchorages along the length of the screw is also possible. Said sleeves also make it possible that the drive screw can be made of several segments. If the entire length of the screw is 8 m, the screw can consist of 4 segments each 2 m, which makes reparation etc more easy.

FIG. 7 shows how the transport cloth 21 is attached to the upper profile strips 16 at each respective upper edge. The transport cloth 21 is provided with several plastic rivets 50 of TEFLON or similar material. The rivets have a sponge-like shape as appears from FIG. 7. The profile strips 16 consists of overhangs extending over the plastic rivets and having a bent edge 52 which engages a slit 51 in the foot of the plastic rivet. There is an upper overhang for the upper part of the transport cloth 21a and a lower overhang for the lower part of the transport cloth 21b. The transport cloth 21 may be provided with a reinforcement strip or a slide strip 53 at the rivets.

Figure 8:
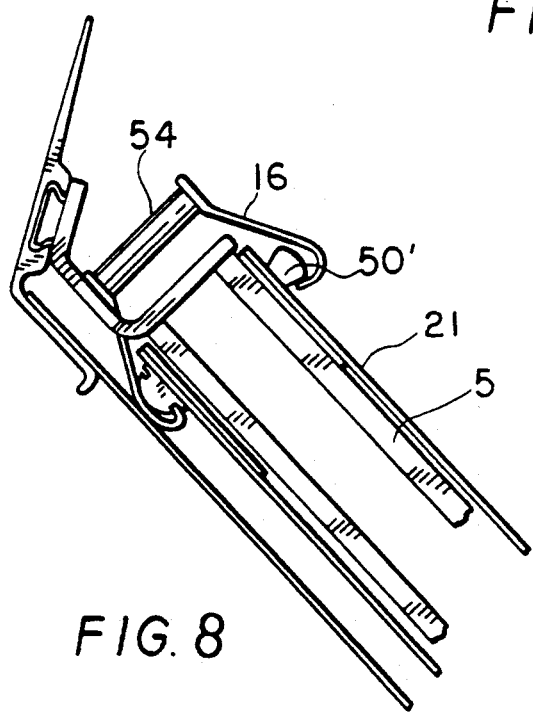
FIG. 8 is a cross-sectional view corresponding to FIG. 6 showing the corresponding details at the front end of the device and an alternative attachment member.

In FIG. 8 there is shown how the profile strips 16 guide the transport cloth 21 at the linking or folding around the front foil 5. A key-shaped distance member 54 is inserted between the two profile strips 16 and cause these strips to separate from each other a short distance before the front foil 5. The profile strip 16 extends preferably around the entire foil 5 so that it guides the cloth 21 during the entire folding. Alternatively, there might be a separate guiding during the folding or the guiding can be omitted during this short distance.

In FIG. 8 there is shown another embodiment of the plastic rivet 50' and the corresponding construction of the overhang, whereby the plastic rivet is tapering towards the foot and the overhang has a corresponding shape.

The corresponding construction is not needed at the back foil 6 since only the pull bands are folded. However, it may be necessary that the pull bands have a certain elasticity or resiliency in order to avoid unnecessary slack.

The loading device according to the invention is preferably used together with a transportation device placed at the airport. The transportation device consists of a first transport band 71, of FIG. 24, perpendicular to the air-plane transporting goods from the ground level, e.g. a lorry platform, to the loading door opening 70. A second smaller transportation device 72 is placed in the loading door opening 70. The stationary transportation devices 71 and 72 are shown in plan view in FIG. 24 while only the smaller transportation device 72 is visible in FIG. 25. The goods are transported by the transportation device 71 up to the transportation device 72 and put the goods on the transportation device 72 in several layers until full height is achieved. When the transportation device 72 is full, it is started and moves the goods to the right in FIG. 25 to the right loading space 73. Then, the same loading method takes place for the left loading space 74, whereby the transportation device 72 is driven in the opposite direction. The transportation device 72 has a partition 75, which pushes the goods and assures that it reaches the adjacent space. The partition 76 in the right space is driven with the same speed, which also is valid for the partition 77 in the left space. At unloading the opposite steps take place.

It is realized that the loading device according to the invention can be used in many other applications such as in other transport vehicles, such as lorries, railway wagon, ships etc. In goods storages there are often spaces which are shallow and have a large depth which must be used for goods whereby the present invention can be used.

In FIGS. 20-23 there is shown a loading method in which the goods are preloaded in modules, which are transported to the air-plane and loaded by the transportation device of FIG. 24

Figure 20:
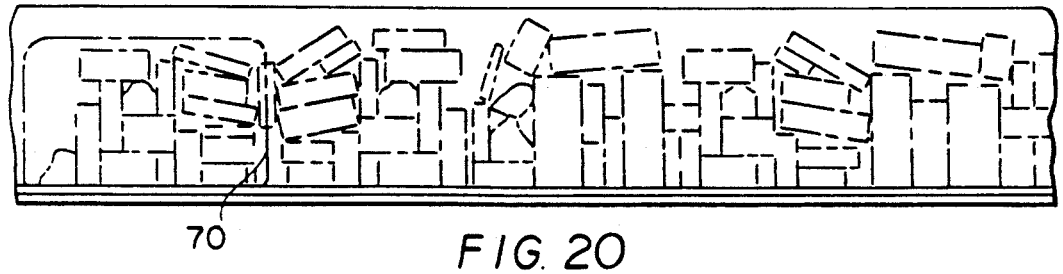
FIG. 20 is a schematic side view of the loading space loaded with goods.

FIG. 20 shows the loading of the loading space with discrete goods or suitcases according to the invention. To the left is shown by broken lines the door opening 70. It is obvious that it can be difficult to unload the suitcases one after the other since they often contact each other and fall at the unloading.

Figure 21:
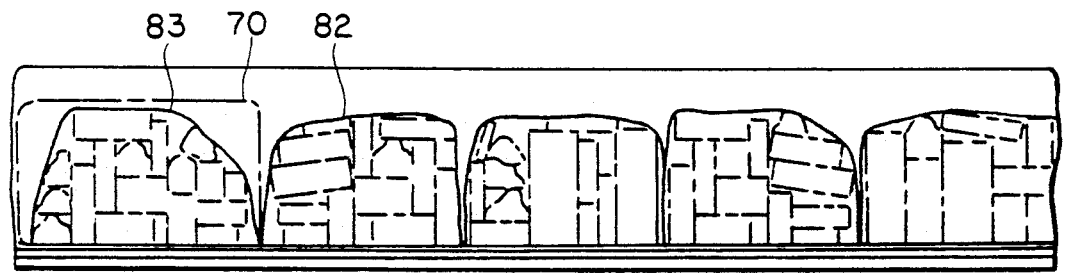
FIG. 21 is a side view similar to FIG. 20 showing the loading space loaded with modules according to the invention.
Figure 23:
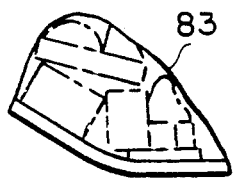
FIG. 23 is an end view showing a module intended to be placed at the door opening.
Figure 22:
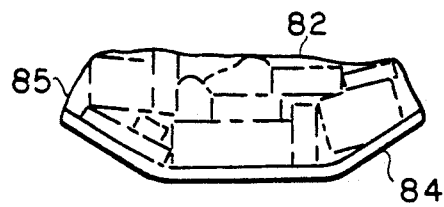
FIG. 22 is an end view showing a single module.

FIG. 21 shows the same loading space loaded with modules 82 and 83 shown in FIGS. 22 and 23.

The module 82 comprises a support 84, e.g. by card board, enclosed by e.g. shrink sheeting 85 of plastics film. The module has such a size that it can be inserted in the loading space of the air-plane through the door opening 70 and fits to the cross-section of the air-plane.

FIG. 23 shows a module 83 which is specifically adapted to be placed opposite the door opening 70 of the loading space.

It appears that the loading space of the air-plane will not be optimally used by the module system of FIG. 21, but it will be much easier to load and unload and the time spent on loading will be considerably shortened. Each module comprises goods intended for the same destination so that the entire module is unloaded at that destination.

FIG. 26 shows the loading space according to FIG. 21 provided with an elongation of the transport cloth. The middle portion of the transport cloth extends beyond the front foil 5 to another foil 5' positioned at the other side of the door opening. The modules 82, 83 are placed on the transport cloth between the foils 5′ and 5 and the transport cloth is driven to the right in FIG. 26 and the module is loaded.

Alternatively, the transportation device 72 can be positioned in the air-plane at the distance between the foils 5′ and 5. The transportation device 72 can be driven by the screws 24, 25 on each side of the transportation device 72 by a suitable transmission, which connects the transportation device to the left screws when it is desired to load or unload the left space and to the right screws when it is desired to load or unload the right space. The transmission also preferably has a idle position where it is not driven.

Of course the invention can be modified in many respects. Thus, the longitudinal T-profile strips can be omitted and their operation to take up loads in the longitudinal direction be taken over by the drive screws. They will then be prevented from breaking at compression loads since they are protected at the lower corner of the space and are supported by the floor and the walls. Moreover, the partition pushes said screws downwards. Further supports may be necessary when the expected loads are high.

Preferably, the screws absorb only tensile loads by the connection to the foils via the sleeves 32 while compression loads are taken up by the T-profile strips.

The slide cloth can also be modified in order to improve the device, especially when extremely low loads are desired. Then, the slide cloth is provided with longitudinal recesses opposite the pull bands, which means that the pull bands will not contribute to the frictional losses but more or less float in these recesses. The longitudinal recesses can be formed in many ways, e.g. by providing the slide cloth with longitudinal reinforcements in the middle thereof of a suitable material, and the recesses being formed between the reinforcements. Suitable material for the reinforcement is a soft foam plastics material.

Electric wires for the drive and control of the electric motor can be positioned below the upper longitudinal strip 16 and will then be protected in the best manner.

The drive screw can alternatively be made only of aluminium or steel. Furthermore, the coal-fibre foils can be replaced by duraluminium and even be made by steel or other suitable material. The choice of material is of course dependant on the application.

The invention can be modified in many respects within the scope of the idea and the intention is that such for a skilled person reading this specification obvious modifications should be included within the scope of the invention. The invention is only limited by the appended claims.

I claim:

1. A loading device for loading and unloading goods into and out of a loading space having a loading opening at a forward part of the loading space, the goods being loaded towards a rear part of the loading space, said loading device comprising:

a framework having at least two longitudinal profile members and forward and rear transverse profile members;

a slide cloth positioned between said profile members;

a partition dividing the loading space into a forward loading space and an empty rear space;

a transport cloth connected to said partition and extending from one side thereof to the forward part of the loading space above said slide cloth and around said forward transverse profile member and backwards below the slide cloth and being connected to several pull bands extending further backwards and below the slide cloth to the rear part of the loading space and thence forwards above the slide cloth and to the other side of the partition and being connected to the partition, wherein said forward transverse profile member comprises a forward foil, the front end of which being rounded into a break edge having a radius of curvature suitable for the transport cloth being folded around said break edge, and that the slide cloth is attached to the forward foil by means of an elastic connection and that the slide cloth at its forward end being provided with a key-shaped member which gives a smooth transition to said forward foil;

several longitudinal drive screws each being anchored to said forward and rear transverse profile members and in at least one intermediate position between its ends by means of sleeves; and several drive nuts each movable along a corresponding longitudinal drive screw by rotation of said longitudinal drive screws and attached to said partition, each drive nut being provided with a longitudinal slit for passing said sleeve at said intermediate position, said drive screws and drive nuts driving said partition, said transport cloth and said drive bands from the forward part of the space to the rear part of the space and vice versa for loading and unloading of goods in the loading space by simultaneous rotation of all drive screws with the same rotational speed by means of a common drive source.

2. A loading device according to claim 1, wherein each drive screw is anchored in the longitudinal direction by means of sleeves at either end of each said drive screw, said sleeves having axial bearings and radial bearings.

3. A loading device for loading and unloading goods into and out of a loading space having a loading opening at a forward part of the loading space, the goods being loaded towards a rear part of the loading space, said loading device comprising:

a framework having at least two longitudinal profile members and forward and rear transverse profile members;

a slide cloth positioned between said profile members;

a partition dividing the loading space into a forward loading space and an empty rear space;

a transport cloth connected to said partition and extending from one side thereof to the forward part of the loading space above said slide cloth and around said forward transverse profile member and backwards below the slide cloth and extending further backwards below the slide cloth to the rear part of the loading space and forwards above the slide cloth and to the other side of the partition and being connected to the partition;

several longitudinal drive screws each being anchored to said forward and rear transverse profile members by means of sleeves; and several drive nuts each movable along a corresponding longitudinal drive screw by rotation of said longitudinal drive screw and attached to said partition, said drive screws and drive nuts driving said partition and said transport cloth from the forward part of the space to the rear part of the space and vice versa for loading and unloading of goods in the loading space by simultaneous rotation of all drive screws with the same rotational speed by means of a common drive source, said forward transverse member comprising a forward foil, the front end of which being rounded into a break edge having a radius of curvature suitable for the transport cloth being folded around said break edge, and that the slide cloth is attached to the forward foil by means of an elastic connection and that the slide cloth at its forward end being provided with a key-shaped member which gives a smooth transition to said forward foil.

* * * * *